Patented Jan. 13, 1953

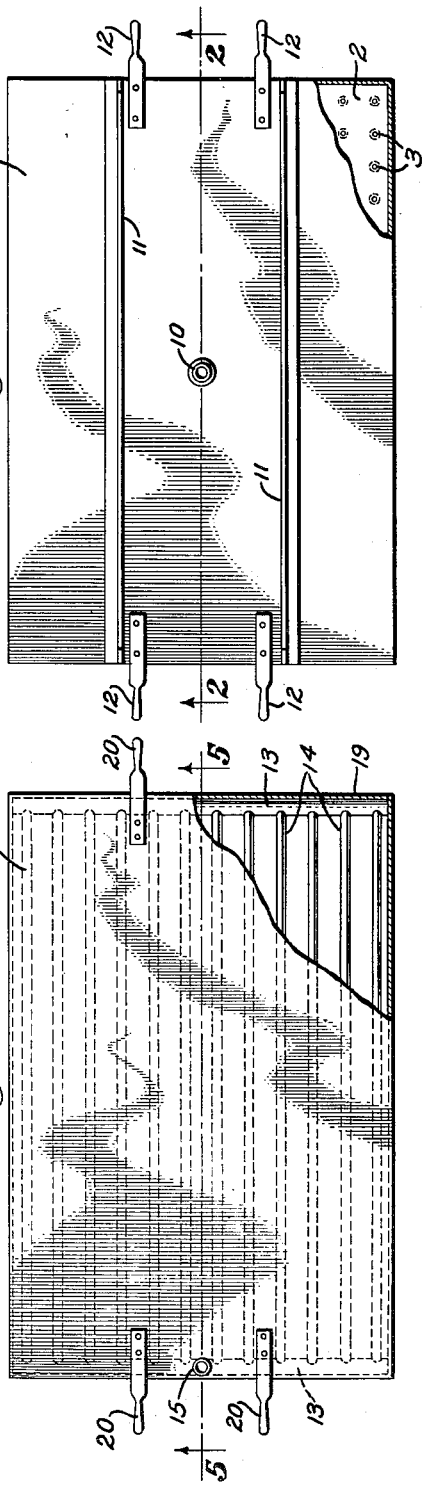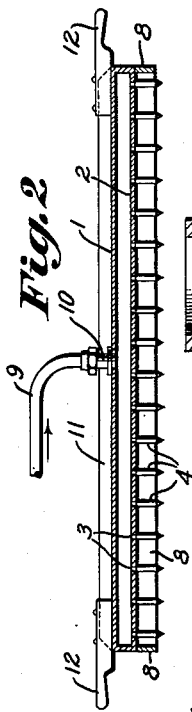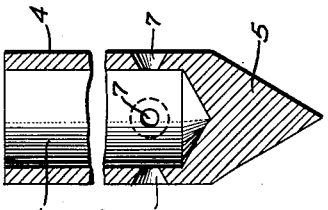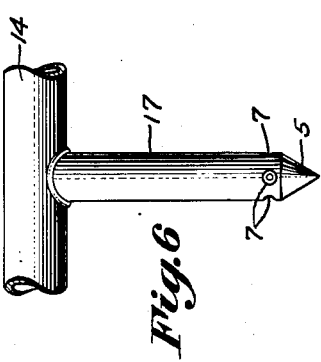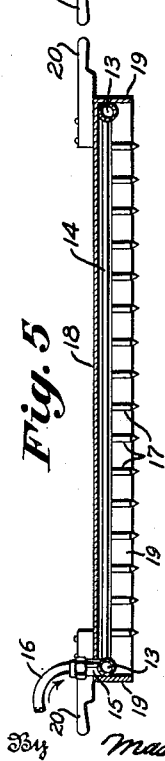

2,625,123

UNITED STATES PATENT OFFICE 2,625,123

PLANT BED STERILIZER

Hillen J. Morgan, La Plata, Md.

Application May 14, 1948, Serial No. 27,118

2 Claims. (Cl. 111—7.1)

This invention relates to improvements in devices for use in sterilizing the soil, particularly of seedbeds, by the use of steam.

The production of early, vigorous, and healthy seedling plants of tobacco and other crops is one of the most important steps in their successful cultivation. The beneficial effects of heated soils on plant growth have been long recognized, and methods of burning over the surface soil for certain crops have been practiced for centuries. With the modern development of agriculture on a more intensive scale and along more scientific lines, new and definite reasons for soil sterilization became evident, and, consequently, improved methods of sterilization have been sought. Various types of heat and chemical treatments for this purpose have been tested, but as yet none has proved as efficient and reliable as sterilization by steam.

The sterilization of soil by steam is of great aid in the production of desirable plants. The principal purposes of soil sterilization are concerned with the destruction of soil-borne plant diseases, weed seeds, and in some cases soil-hibernating insects, and at the same time sterilization ordinarily has the effect of increasing soil fertility and producing conditions in general more favorable to the rate and uniformity of plant growth.

Several methods of steam sterilizing have been used including, burying a grid of perforated steam pipe, thrusting a perforated pipe into the ground and introducing steam, and the so-called pan method which consists in placing an inverted pan of considerable size over an area to be treated and introducing steam into the space beneath the pan. Of these methods, the last is by far the most satisfactory and most used. All of these methods have disadvantages. To secure the most beneficial results from soil sterilization, the soil must be heated to considerable depth, 4 to 6 or 8 inches, and the heat at this depth must be held for a period of time. The first two of these methods secure quick depth penetration, but the steam is not confined in the soil and escapes before it can penetrate the soil laterally, and, consequently, the soil is not evenly heated. The pan method achieves complete penetration, but the time required is considerable. It takes approximately one-half hour to secure the necessary penetration, and as the pans are usually some six by eight feet in size many hours are required to sterilize a seed bed of several thousand square feet.

The object of the present invention is to provide apparatus for steam sterilization of soil, by means of which quick and deep penetration may be obtained and the steam will be confined to insure complete lateral penetration.

A more specific object is to provide in a device of this character means for sub-surface outlet of the steam and means to prevent the sub-surface outlets from becoming clogged when the device is being inserted into the soil or withdrawn therefrom.

Other objects of the invention will become apparent from the following description of several embodiments of the invention when taken in conjunction with the drawings which accompany and form a part of this specification.

In the drawings:

Figure 1 is a top plan view of a device embodying the principles of the present invention, part being broken away to show the interior;

Figure 2 is a longitudinal section through the device shown in Figure 1 and is taken on the line 2—2 of Figure 1;

Figure 3 is an enlarged vertical section through one of the soil penetrating tines, the central portion of the tine being broken away;

Figure 4 is a top plan view of a modified form of the invention, a portion of the top being broken away to show underlying structure;

Figure 5 is a longitudinal section through the modified structure taken on the line 5—5 of Figure 4; and Figure 6 is an enlarged elevation of a portion of one of the steam pipes employed in the modified form with one of the soil penetrating tines attached.

Briefly, the present invention consists in means for confined distribution of steam over a large area, a plurality of soil-penetrating tines carried by and in communication with the distribution means, and a skirt peripherally of the distribution means and framing the bank of tines.

Referring in detail to the drawings, and first adverting to that form of the invention shown in Figures 1 to 3, inclusive, the device comprises a distributing or storage chamber 1 which is of rectangular shape and of substantial length and breadth to cover a large soil area. The chamber 1, however, is relatively thin. The bottom wall 2 of the chamber is provided with longitudinal and transverse rows of perforations 3 to which are fitted tines 4. Tines 4 are welded or otherwise secured to the bottom wall of the chamber.

Tines 4 are straight-walled, hollow members for the greater portion of their length, and have solid, pointed, bottom tips 5. The hollow interior 6 opens through the top so that communication is afforded from the chamber 1 to the interior of the tines. Just above the pointed tips 5 the walls of the tines are perforated, as at 7, to permit the escape of steam. The jet openings 7 flare outwardly to prevent dirt from clogging them as the tines are inserted in the soil or withdrawn therefrom. As the soil is thoroughly processed for planting before being sterilized, the soil is loose and light and likely to get caught in the openings. The flare provides cam surfaces designed to force outwardly any loose soil which may tend to flow into the openings. The upper inclined surfaces serve to force the dirt outward when the tines are forced into the soil, and the lower inclined surfaces function similarly when the tines are withdrawn. The outwardly flaring jet openings permit the steam to escape in diverging directions so that an ever widening cone of steam enters the soil to increase the rate of complete penetration.

Depending from the peripheral edges of the chamber 1, and serving as a framing surrounding the bank of tines, is a skirt 8. The skirt is of uniform depth and almost as long as the tines and is designed to penetrate the soil to block off the particular area being processed. It will be noted from the drawings that the jet openings 7 are generally in the plane of the bottom edge of the skirt 8.

Steam is supplied to the chamber 1 from any available source through a hose line 9 which is connected to an inlet fitting 10 mounted in the top of the chamber.

As the entire device is formed of sheet metal, suitable angle iron braces 11 may be welded to the top to provide the required rigidity. Handles 12 are positioned at either end of the device to facilitate moving it from place to place.

In Figures 4 to 6 inclusive a slightly modified form of the invention is shown. In this form the steam chamber is eliminated, and a grid of steam pipe is substituted as the steam distribution means. The grid comprises transverse headers 13 connected by a plurality of longitudinally extending, parallel, pipes 14. One of the headers 13 is provided with an inlet fitting 15 to which a supply hose 16 may be attached. Each pipe 14 is perforated at spaced points along its underside to receive tines 17, similar to those of the first-described form. The pipes are evenly perforated to position the tines in longitudinal and transverse rows, the spacing between perforations being equal to the distance between pipe centers so that the spacing between tines will be the same in both directions. A cover plate 18 having down-turned peripheral flanges 19 is positioned over the grid, the flanges 19 forming the skirt to frame the tine bank. Lifting handles 20 are attached to the cover plate.

In use, the sterilizer is taken to the seed bed to be processed and placed over the area to be first worked. The hose is connected to the steam inlet fitting and the device is pressed firmly to cause the tines and framing skirt to penetrate the soil to the desired depth. Steam is then turned on filling the chamber 1 or grid as the case may be, and being distributed to all of the tines. As the tines are in the soil, the steam will escape from the openings below the surface and infiltrate the soil in all directions. The steam will be confined within the area of the tines by the skirt and can only move upwardly or downwardly. The bottom of the steam chamber or cover plate will prevent the escape of the steam upwardly thus maintaining the steam pressure, ensuring complete lateral penetration and sterilization and forcing the steam to penetrate even deeper into the soil. As the tine rows are equally spaced in both directions, the spacing between tines will be uniform, and even lateral penetration will be obtained. After a suitable time period the steam will be turned off, and the device moved to the next adjacent area. Step by step the device is moved until the entire seed bed has been covered.

Due to the fact that the steam enters the soil beneath the surface, much valuable time is saved in getting the required heat for sterilization to the necessary depth for beneficial results. Consequently, the time for the operation may be greatly reduced. When the soil is once heated, it releases the heat very slowly, and sterilization may be achieved after as short a period of steaming as five minutes. If it is desired to hold the steam in the ground for longer periods, several of these devices may be used in rotation, each piece of apparatus being left in place on the soil after the steam has been cut off, while steam is being applied to adjacent areas. The steamed areas may also be covered with canvas or the like to hold the heat in the soil.

While the introduction of the steam beneath the surface is quite important, the blocking off by the skirt of the area under treatment makes the process much more effective.

While in the above certain practical embodiments of the invention have been illustrated and described, it is to be understood that many changes may be made from the precise embodiments disclosed without departing from the scope of invention as defined in the appended claims.

What is claimed is:

1. In apparatus for steam sterilization of soil, a flat top portion, a skirt of uniform length secured to and depending from the perimetric edge of said top portion and having its lower edge in a horizontal plane, depending hollow tines secured to the top portion within the skirt and having lateral jet openings at their lower ends, said jet openings being disposed generally in the plane of the lower edge of the skirt, and steam supply means communicating with said hollow tines.

2. In apparatus for steam sterilization of soil, a flat top portion having a chamber therein, a skirt of uniform length secured to and depending from the perimetric edge of said top portion and having its lower edge in a horizontal plane, depending hollow tines secured to the top portion within the skirt having their hollow interiors in communication with said chamber and having lateral jet openings at their lower ends, said jet openings being disposed generally in the plane of the lower edge of the skirt, and steam supply means communicating with said chamber.

HILLEN J. MORGAN.

REFERENCES CITED

The following references are of record in the file of this patent:

UNITED STATES PATENTS

| Number | Name | Date |
|---|---|---|
| 1,021,530 | Johnson | Mar. 26, 1912 |
| 1,895,335 | Maxen | Jan. 24, 1933 |

FOREIGN PATENTS

| Number | Country | Date |
|---|---|---|
| 422,712 | Great Britain | Jan. 17, 1935 |

OTHER REFERENCES

Farm Implement and Machinery Review (page 820), Feb. 1, 1944.